United States Patent Office 2,987,273
Patented June 6, 1961

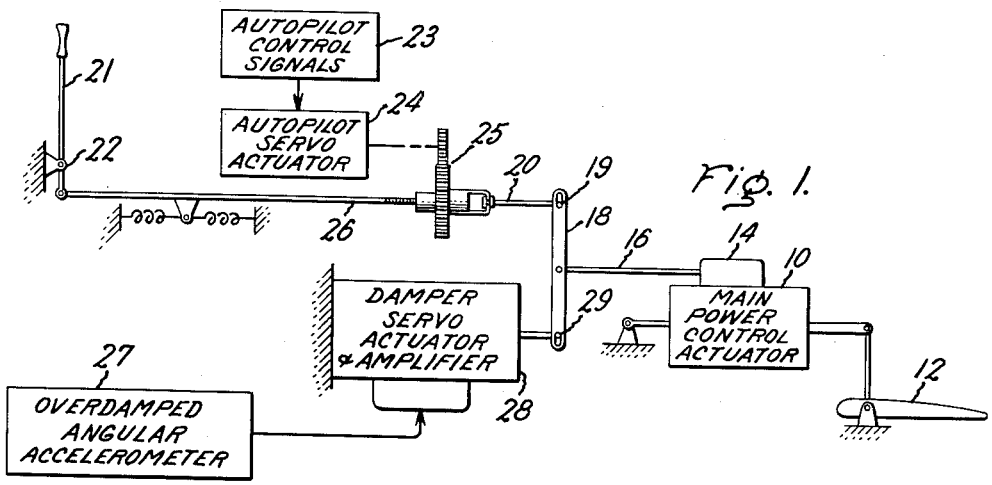
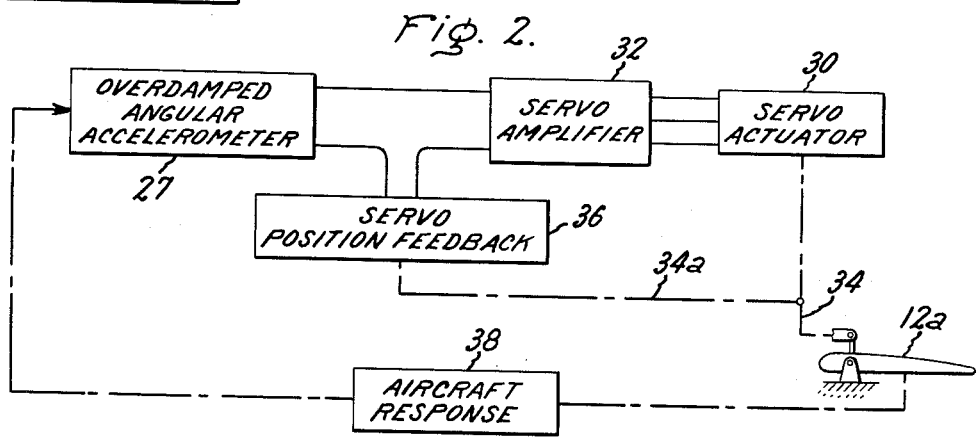
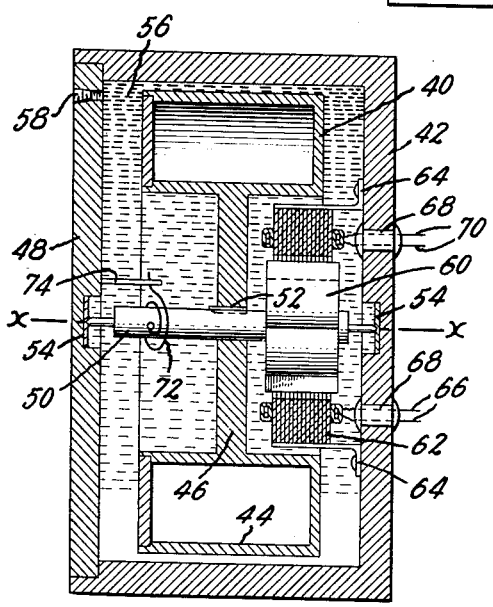
Inventors:
Robert L. Wanamaker,
Frank A. Gaynor,
by Roe D McBurnett
Their Attorney.

2,987,273
SENSING DEVICE AND DAMPING SYSTEM FOR AIRCRAFT
Robert L. Wanamaker, Pittsfield, Mass., and Frank A. Gaynor, Schenectady, N.Y., assignors to General Electric Company, a corporation of New York
Filed Apr. 5, 1957, Ser. No. 651,054
8 Claims. (Cl. 244—77)

This invention relates to a sensing device and to a damping system for use in aircraft to dampen oscillations of such aircraft and, more particularly, to an overdamped sensing device and a damping system using such overdamped sensing device.

In modern aircraft, due to their great speed and configuration, there is a recognized tendency for the aircraft to oscillate about one or more of its axes whenever the aircraft is disturbed in flight. For example, when a gust of wind impinges on the side of an aircraft in level flight, the aircraft is disturbed from its normal heading and tends to oscillate about its yaw axis in returning to the normal heading. Because of the speed of the aircraft, and the relatively slow response time of the human pilot, any attempt by the human pilot to correct for such disturbance generally has the effect of increasing the swing of the oscillation. For by the time the pilot has operated the rudder of the aircraft to correct for the change in heading, the aircraft has already begun to return to its original heading. The movement of the rudder by the human pilot increases the rate of the return of the aircraft so that it swings to the other side of its normal heading to a greater degree than it would if the human pilot had not applied a rudder correction. Since the human pilot's response time is comparatively slow as compared to the speed of the aircraft and to its oscillation during a disturbance, when the aircraft reaches the correct heading on one of its oscillatory swings, the human pilot is unable to correct the rudder deflection to prevent an oscillation to the other side. Therefore, the human pilot's corrections generally have the effect of increasing the period of oscillation of the aircraft during a disturbance. Of course, similar oscillations will occur about the roll and pitch axis of the aircraft during a disturbance about these axes.

To correct for the oscillations of an aircraft, it has been the practice in the past to provide automatic damping means. These damping means are connected to provide a signal to the automatic flight control systems of modern aircraft to dampen the oscillations. Alternatively, a damping system is provided having an actuator connected to a control surface of an aircraft. The actuator is controlled by the sensing means of the damping system to move the control surface in a direction to dampen the oscillations. Known damping systems generally utilize a rate gyro as a sensing device to detect the aircraft angular velocity about an axis of the aircraft during a disturbance about this axis. The rate gyro generates a signal proportional to the angular velocity of the aircraft oscillations and applies this signal to the automatic flight control system of the aircraft, or to the damping system actuator to provide the necessary corrections to the proper control surface to dampen the oscillations. Since the response time of the rate gyro is very rapid, that is it detects the movement of the aircraft about its axis almost simultaneously with the movement, the necessary control surface movement can be obtained at the beginning of the disturbance and thus greatly reduce the amplitude of the aircraft oscillation as well as shortening its period. However, a rate gyroscope will detect the angular velocity of the aircraft about an axis of the aircraft during maneuvering of the aircraft as well as during a disturbance. Therefore, it is necessary to include a steady-state rate cancellor in such damping systems to cancel the steady-state rate gyro signals which occur during maneuvering, while passing the transient rate gyro signals which occur during a disturbance. Damping systems of the types described above in general perform their desired functions adequately. However, they add excess weight, complexity and cost to the aircraft and to aircraft flight control systems. Also of course, due to the increased complexity of the flight control system, its reliability is decreased since there are a greater number of components subject to failure.

As is well known to those familiar with aircraft control systems there is a constant and continuing effort to improve the reliability of such systems while at the same time decreasing their cost, weight and complexity. There is also a constant effort to reduce the weight, cost and complexity of aircrafts in general.

Therefore, it is an object of this invention to provide a simplified automatic damping system for aircraft.

It is a further object of this invention to provide an automatic damping system having less weight and greater reliability than is presently obtainable in known damping systems.

A still further object of this invention is to provide a sensing means for an aircraft damping system which will generate a signal proportional to angular velocity during high-frequency oscillations of an aircraft and which generates signals proportional to angular acceleration during low-frequency oscillation of such aircraft.

A further object of this invention is to provide an automatic damping system for aircraft which utilizes a single device to perform the functions of both the rate gyro and cancellor units of prior damping systems.

Another object of this invention is to provide a damping means for use with an automatic flight control system which is less complex and less costly than presently known means and which effects a saving in weight.

In carrying out this invention in one form an aircraft having a control surface for controlling movement of the aircraft about one of its axes is provided with a sensing means which is responsive to deviations of the aircraft about the controlled axis. This sensing means is so constructed and arranged that it generates a signal proportional to the angular velocity of the movement of the aircraft during high-frequency oscillations, that is oscillations in the region of the natural frequency of the aircraft and it generates a signal proportional to the angular acceleration of the movement of the aircraft at frequencies below the required aircraft damping range. Signal responsive means are provided between the control surface and the sensing means for positioning the control surface proportional to the generated signal in order to correct any undesired deviation of the aircraft about the controlled axis.

This invention will be better understood from the following description taken in connection with the accompanying drawing wherein:

FIGURE 1 is a block diagram showing one form of the damping system of this invention, FIGURE 2 is a block diagram of one form of the damping means of this invention showing the connection of the sensing device to a flight control system, FIGURE 3 is a sectional view of one embodiment of a sensing device which forms a part of this invention.

Referring to the drawing wherein like numerals are used to indicate like parts throughout and, in particular, with reference to FIGURE 1, this invention in one form is shown in conjunction with a flight control system for an aircraft. As is well known to those skilled in this art, present day flight control systems are provided with a power control actuator 10 which reversibly positions a control surface 12 of an aircraft (not shown). The power actuator 10 is operated by a control means 14 in response to movement of linkage 16 and 18. Actuator 10 and control means 14 may be hydraulic, electrical or other type of equipment, being indicated as hydraulic for purpose of illustration only. The link 16 is pivoted to the midpoint of link 18, while one end of link 18 is pivotally connected to one end of a shaft 20, as at 19. The shaft 20 is reciprocally moved either by the manual controller 21 which is pivotally mounted about point 22, or by automatic pilot means. The automatic pilot means is shown as a block 23 representing autopilot control signals which are fed to an autopilot servo actuator 24 which drives a gear means 25 to move shaft 20 by shortening or lengthening shaft 26. This system of combined manual and automatic control is more fully described in copending patent application Serial No. 500,482 for "Control Apparatus," filed April 11, 1955 in the names of Frederick R. Radcliffe and Charles G. Mallery, and assigned to the same assignee as the present invention. For purposes of this invention it is sufficient to state that the control surface 12 is reversibly positioned either manually or automatically through the above-described linkage and controllers.

To the above-described combined manual and automatic pilot control system a damping feature is added in accordance with this invention to prevent or dampen any undesired oscillations of an aircraft which may be caused by disturbances to the aircraft. This damping feature is shown in FIGURE 1 as an overdamped angular accelerometer 27 which senses oscillatory movement of the aircraft and generates a signal proportional to such movement. This signal is applied to a damper servo actuator 28 which may also include an amplifier if desired. The damper servo actuator 28 is pivotally connected to the opposite end of link 18 as at 29 and actuates the linkage 18 and 16 in response to the signals generated by the overdamped angular accelerometer 27 to reversibly position the control surface 12 to correct or dampen the movement of the aircraft. The overdamped angular accelerometer 27 operates independently of the manual or automatic control system to provide the desired damping to the aircraft. It should also be understood that the damping means herein described will also serve to dampen any oscillatory movements sensed by the accelerometer 27 even during a controlled movement of the aircraft commanded by either the manual controller 21 or the autopilot control system through the above-described linkage means.

FIGURE 2 shows one form of the damping system of this invention as applied to an automatic flight control system for an aircraft. The automatic flight control system is provided with a servo actuator 30 which is operated by a servo amplifier 32 in response to a command signal from an automatic pilot device such as a gyroscope to move a control surface 12a of an aircraft to provide a desired aircraft movement or response. As shown in FIGURE 2 the control surface of an aircraft, for example, elevator 12a is actuated through a mechanical linkage 34 by servo actuator 30. The servo actuator 30 is energized by an output signal from servo amplifier 32 in response to a command signal from an automatic pilot device (not shown) in a manner well known to those skilled in the art. As the servo actuator 30 moves elevator 12a through mechanical linkage 34 it also drives a servo position feedback or follow-up 36 through mechanical linkage 34a to provide the necessary follow-up to the servo amplifier 32 and correctly position elevator 12a.

In the damper means of this invention a sensing device is mounted on an aircraft so as to sense angular movement of the aircraft about one of its axes. The sensing device generates a signal proportional to the angular movement of the aircraft about the axis. In the preferred embodiment of the invention the sensing device takes the form of an angular accelerometer, 27, whose dynamic response characteristics have been modified to provide the desired response to the aircraft movement and to generate a signal proportional thereto. In FIGURE 1 the signal from accelerometer 27 is fed to the damper servo actuator 28, thereby moving linkage 18 and 16, which in turn operates control means 14 and power control actuator 10 to position control surface 12. As indicated in FIGURE 2, the signal from accelerometer 27 is fed to the servo amplifier 32, thereby energizing the servo actuator 30, which moves the elevator 12 through mechanical linkage 34.

An angular accelerometer, when positioned with its axis parallel to an axis of an aircraft, will generate a signal proportional to the angular acceleration of the aircraft about such axis. It has been discovered that if an angular accelerometer is provided with damping means such that the movement of the sensing element of the angular accelerometer is damped beyond its critical damping point, the dynamic response characteristics of the angular accelerometer will be changed. As is well understood, critical damping of an accelerometer is the damping which allows the accelerometer to respond as rapidly as possible to a transient without overshoot or oscillation. This damping of the accelerometer beyond critical damping will be termed overdamping and the accelerometer having such damping will be termed an overdamped accelerometer. When an angular accelerometer is overdamped the sensing element is unable to follow high-frequency oscillations. Therefore, instead of generating a signal which is proportional to the angular acceleration of the aircraft at such high-frequency oscillations the accelerometer generates a signal which is proportional to the angular velocity of the aircraft at such oscillations. At high-frequency oscillations of the aircraft the overdamped angular accelerometer reacts as a rate gyroscope, that is, it generates a signal proportional to angular velocity. However, at low frequencies the accelerometer is still able to follow the angular accelerations of the aircraft and therefore, will generate a signal proportional to low-frequency angular accelerations of the aircraft in the manner of a normal angular accelerometer.

When an aircraft is disturbed in level flight the disturbance causes high-frequency oscillations of the aircraft. It is this high-frequency oscillation which the automatic damping system of modern aircraft is used to correct. Therefore, it can be seen that an angular accelerometer which is overdamped can be used in such damping systems to provide the necessary signal to the automatic flight control system of an aircraft to dampen the oscillations. Further, since an overdamped angular accelerometer only responds to accelerations at low frequencies, any maneuvering of an aircraft, which occurs at low frequencies and at a constant angular velocity, as is the case during steady-state turning flight, will not cause the overdamped angular accelerometer to provide a signal in response thereto, (as is more fully discussed in the preceding paragraph). Therefore, there is no need for a cancellor unit in a damping system using an overdamped angular accelerometer.

FIGURE 3 is a sectional view of an angular accelerometer which may form the sensing unit of the damping system of this invention. As shown in FIGURE 3 the angular accelerometer comprises an inertia element 40 pivotally mounted for rotation within a case or housing 42. The inertia element 40 may be of any desired form, being shown for purposes of illustration only, as having an outer annular portion 44, which is preferably hollow as shown, surrounding a solid disc-like portion 46. The case or housing 42 is cylindrical in form, having a removable cover 48. The inertia element 40 is rotatably mounted within the housing 42 for rotation about an axis $x$—$x$ passing through its center of rotation. The inertia element 40 is fixedly mounted on a shaft 50, passing through disc-like portion 46. The inertia element 40 may be attached to the shaft 50 in any desired manner, as for example by key and slot means 52. The shaft 50 is rotatably mounted within the housing 42 on bearing means 54—54, which are preferably jewel bearings. The area between the inertia element 40 and the case or housing 42 may be filled with a damping and flotation fluid 56. This damping fluid 56 may advantageously be silicone oil which both damps the movements of the inertia elemnet 40 and at the same time provides flotation for such inertia element so as to reduce or eliminate the load on the bearings 54—54. By proper design of the inertia element, its relation to the flotation fluid 56 will be such that the inertia element is neutrally suspended within the case 42 so that there is no load on bearings 54—54. This flotation greatly enhances the sensitivity and accuracy of the inertia element 40, as is well known to those skilled in the art. Also, the design may be such that the center of rotation and the center of buoyancy and the center of gravity of inertia element 40 are coincident. A filler port 58 may be provided in removable cover 48 to introduce the flotation and damping fluid 56 into housing 42. The removable cover 48 is sealed on the housing in any desired manner, as for example, by cementing with an epoxy resin.

A pick-off means is provided which senses the relative movement between the inertia element 40 and the case or housing 42. As shown in this embodiment the pick-off means is a differential transformer type pick-off which comprises a rotor 60 fixedly mounted on the shaft 50 and rotatable therewith, and a stator 62 is attached to one side of housing 42, as for example, by brackets 64. Excitation of the stator 62 is provided through leads 66—66, which may be connected to any source of alternating electric current. Leads 66—66 may be brought into the housing 42 through a seal 68 which will electrically insulate the leads from the housing and also provide a seal to prevent any leakage of the damping and flotation liquid from the housing 42. The signal generated by the pick-off element is taken from the stator 62 through the leads 70—70, which are brought out of the side of housing 42 through another seal 68. Coupling or centering means between the inertia element 40 and the housing 42 are provided by a spiral spring 72. The spring restraint of the spring 72 tends to return the inertia element 40 to its centered position within housing 42. As shown in FIGURE 3, one end of spiral spring 72 is connected to the housing 42 by a lug or post 74, while the other end of the spring is fixed to the shaft 50. If desired, the coupling could be electrical, using the centering torque of the differential transformer.

When an angular accelerometer is used in the damping system of this invention, its undamped natural frequency and its damping factor as an overdamped angular accelerometer are so chosen that the unit will provide an output equivalent to that of a rate gyro in the region of the natural frequency of the aircraft. This will provide the desired damping augmentation to the aircraft in this region. At frequencies below the required aircraft damping range, the accelerometer will only provide an output for aircraft angular accelerations. Since maneuvering of the aircraft occurs at frequencies below its natural frequency and at a constant angular velocity it will be understood that the overdamped angular accelerometer will not have any output signal, thus reacting in the same manner as a rate gyro and cancellor unit to steady-state maneuvering of the aircraft. The overdamping of the angular accelerometer can be obtained by increasing the viscosity of the damping and flotation fluid. The undamped natural frequency of the accelerometer is changed by means of the spring which couples the sensing or inertia element to the accelerometer housing. Of course, it should be understood that if for any flight condition it is desired to change the range of the damping system, this could be performed in flight by either changing the damping factor of the overdamped angular accelerometer by varying the temperature of the damping fluid, or by changing the accelerometer's natural frequency by varying the spring restraint.

For a description of the operation of the damping system of this invention, referring to the system of FIGURE 2, the overdamped angular accelerometer 27 will be considered as being mounted with its axis $x$—$x$ parallel to the pitch axis of the aircraft, thereby detecting movements of the aircraft about such aircraft axis. If the aircraft (not shown) were flying in level flight and were suddenly caused to pitch forward, nose down, due to a downdraft or the like, this pitching would be sensed by the overdamped angular accelerometer as indicated by the dotted lines from block 38, aircraft response, in FIGURE 2. As the aircraft pitches forward the housing 42 of the accelerometer 27, which is attached to the aircraft, would follow the movement of such craft. The inertia element 40 would tend to maintain its position the same as it was prior to the pitching movement of the aircraft. However, due to the overdamping of the inertia element the acceleratory motions of the aircraft sensed by the inertia element are integrated, thereby making the relative movement between the case and the inertia element proportional to the velocity of the pitching movement rather than the acceleration of the pitching movement. A signal proportional to the velocity of the pitching movement, which is generated by the pick-off of the angular accelerometer, is fed to the servo amplifier 32, which in turn energizes the servo actuator 30, thus moving elevator 12a through the mechanical linkage 34 in an upward direction to counteract the nose-down pitching of the aircraft. As the aircraft response to the movement of elevator 12a causing the nose of the aircraft to be raised, the overdamped angular accelerometer will sense the velocity of this movement in the same manner as before, thereby generating a signal proportional to such movement. Obviously, the polarity of this signal will be reversed since the sensed movement is in the opposite direction. This signal is likewise fed to the servo amplifier 32 thereby actuating the servo actuator 30, moving the elevator 12a in a downward direction, tending to level the aircraft. When using an overdamped angular accelerometer damping system, it has been found that the disturbances of the aircraft tend to be dampened without any oscillations.

Of course, should the pilot desire to maneuver about the controlled axis, such as diving or climbing, the oscillation frequency of such maneuver would be very low and would generally be performed at a constant velocity. Therefore, the inertia element of the accelerometer would move in the same direction and at the same time as the housing thereof and would not generate any signal in response thereto. It is readily seen that this system eliminates the need for a cancellor device in the damping system, thus greatly simplifying presently utilized damping systems. Of course the elimination of the cancellor substantially reduces the weight of such system. Further, by using an accelerometer in place of a rate gyro the size, the weight and the cost of the system are further reduced.

Obviously, the operation of the damping system shown in FIGURE 1 is similar to that described for FIGURE 2, the main difference being that the signal generated by the accelerometer 27 operates the damper actuator 28 rather than the autopilot servo actuator. However, the damping of the aircraft oscillations is provided in the same manner. Of course, the damping system herein described can be applied to any axis of the aircraft about which damping is desired or required, or it can be applied to any number of axes by providing a separate overdamped angular accelerometer for each axis about which damping is desired.

The accelerometer and damping system shown herein are for purposes of illustration only. It is obvious that various changes could be made in the accelerometer and the damping system, or other types of accelerometers could be used without departing from the spirit or scope of the present invention as defined in the appended claims.

What is claimed as new and desired to be secured by Letters Patent is:

1. An automatic damping system for controlling oscillations of an aircraft about one of its axes comprising; an automatic control system for moving a control surface of said aircraft in response to a command signal, means responsive to a deviation of said aircraft about said one axis, said means providing a signal to said automatic control system in response to said deviation for moving said control surface in a direction to correct for said deviation, said means being so constructed that a signal responsive to the velocity of the deviation is provided for high frequency deviations and a signal responsive to acceleration is provided for low frequency deviations.

2. An automatic damping system for controlling oscillations of an aircraft about one of its axes comprising; an automatic control system for controlling a control surface of said aircraft, accelerometer means responsive to deviations of said aircraft about one of said axes, said accelerometer means being so constructed and arranged that its high-frequency response is proportional to angular velocity while its low-frequency response is proportional to angular acceleration, pick-off means associated with said accelerometer means for generating a signal proportional to the response of the accelerometer means to deviations of said aircraft, and means connecting the output of said pick-off means to said automatic control system for controlling said control surface in response to said aircraft deviation.

3. An automatic damping system for controlling oscillations of an aircraft about one of its axes, said aircraft having a control surface for controlling movement about said one axis comprising; means responsive to deviations of said aircraft about said one axis for generating a signal proportional to said deviation and signal responsive means interconnected between said control surface and said signal generating means for moving said control surface in a direction to correct for said deviation in response to such generated signal, said signal generating means being so constructed that a signal proportional to the velocity of the deviation is generated for high frequency deviations and a signal proportional to acceleration is provided for low frequency deviations.

4. In an automatic damping system for an aircraft for controlling oscillations of said aircraft about one of its axes, a control surface being provided for controlling said aircraft about said one axis, accelerometer means mounted on said aircraft so as to generate a signal in response to movement of said aircraft about said one axis, said accelerometer being provided with damping means and restraint means so chosen that said accelerometer means generates a signal proportional to the velocity of said aircraft movement when said movement is of a frequency within the range of the natural frequency of said aircraft and generates a signal proportional to the acceleration of said movement at a low frequency relative to said aircraft natural frequency, actuator means connected to said control surface for reversibly positioning said control surface, and means interconnecting said accelerometer means and said actuator means for energizing said actuator means by said generated signal for positioning said control surface proportional to said generated signal.

5. In an automatic damping system for controlling oscillations of an aircraft about one of its axes, means responsive to deviations of said aircraft about one of its axes for generating a signal proportional to said deviations, said means being so constructed and arranged that it responds to the velocity of high-frequency deviations and to the acceleration of low-frequency deviations, actuator means connected for actuating a control surface of said aircraft for controlling movement of said aircraft about said one axis, means interconnecting said signal generating means and said actuator means for energizing said actuator means by said generated signal for moving said control surface proportional to said generated signal.

6. In a damping system for an aircraft having a control surface, an actuator for reversibly positioning said control surface, accelerometer means responsive to oscillatory motions of said aircraft for generating a signal proportional to the rate of such motion, said accelerometer means being provided with damping means and restraining means so chosen that said accelerometer means generates a signal proportional to the velocity of said oscillatory motion when said motion is of a frequency in the vicinity of the natural frequency of said aircraft, and generates a signal proportional to the acceleration of said motion when said motion is of a low frequency compared to said aircraft natural frequency, and means interconnecting said actuator and said accelerometer means for energizing said actuator by said generated signal for moving said control surface proportional to said generated signal.

7. In a damping system for an aircraft having a control surface, an actuator for reversibly positioning said control surface, an overdamped angular accelerometer responsive to oscillatory motions of said aircraft for generating a signal proportional to the rate of such motion, said overdamped angular accelerometer being provided with damping means and restraining means so chosen with respect to the critical damping of said accelerometer and its undamped natural frequency that said overdamped angular accelerometer generates a signal proportional to the velocity of said oscillatory motion when said motion is of a frequency in the vicinity of the natural frequency of said aircraft, and generates a signal proportional to the acceleration of said motion when said motion is of a low frequency compared to said aircraft natural frequency, and means interconnecting said actuator and said overdamped angular accelerometer for energizing said actuator by said generated signal for moving said control surface proportional to said generated signal.

8. A damping system for an aircraft having a control surface comprising; actuator means for reversibly positioning said control surface, means responsive to oscillatory motion of said aircraft for generating a signal which in response to high-frequency oscillatory motion is proportional to velocity and in response to low-frequency oscillatory motion is proportional to acceleration, and means interconnecting said actuator means and said signal generating means for energizing said actuator means by said generated signal for moving said control surface proportional to said generated signal.

References Cited in the file of this patent
UNITED STATES PATENTS

| | | |
|---|---|---|
| 2,366,995 | Aulin | Jan. 9, 1945 |
| 2,621,873 | Gordon | Dec. 16, 1952 |
| 2,743,889 | White | May 1, 1956 |
| 2,853,287 | Draper et al. | Sept. 23, 1958 |
| 2,859,026 | Adamson et al. | Nov. 4, 1958 |
| 2,866,933 | Bond et al. | Dec. 30, 1958 |